J. HARTNESS.
MECHANISM FOR GAGING SCREW THREADS.
APPLICATION FILED SEPT. 16, 1919.

1,377,069.

Patented May 3, 1921.

J. HARTNESS.
MECHANISM FOR GAGING SCREW THREADS.
APPLICATION FILED SEPT. 16, 1919.

1,377,069.

Patented May 3, 1921.
5 SHEETS—SHEET 2.

Witnesses:
G. E. Gustafson

Inventor:
James Hartness
by Wright Brown Quinby May
attys

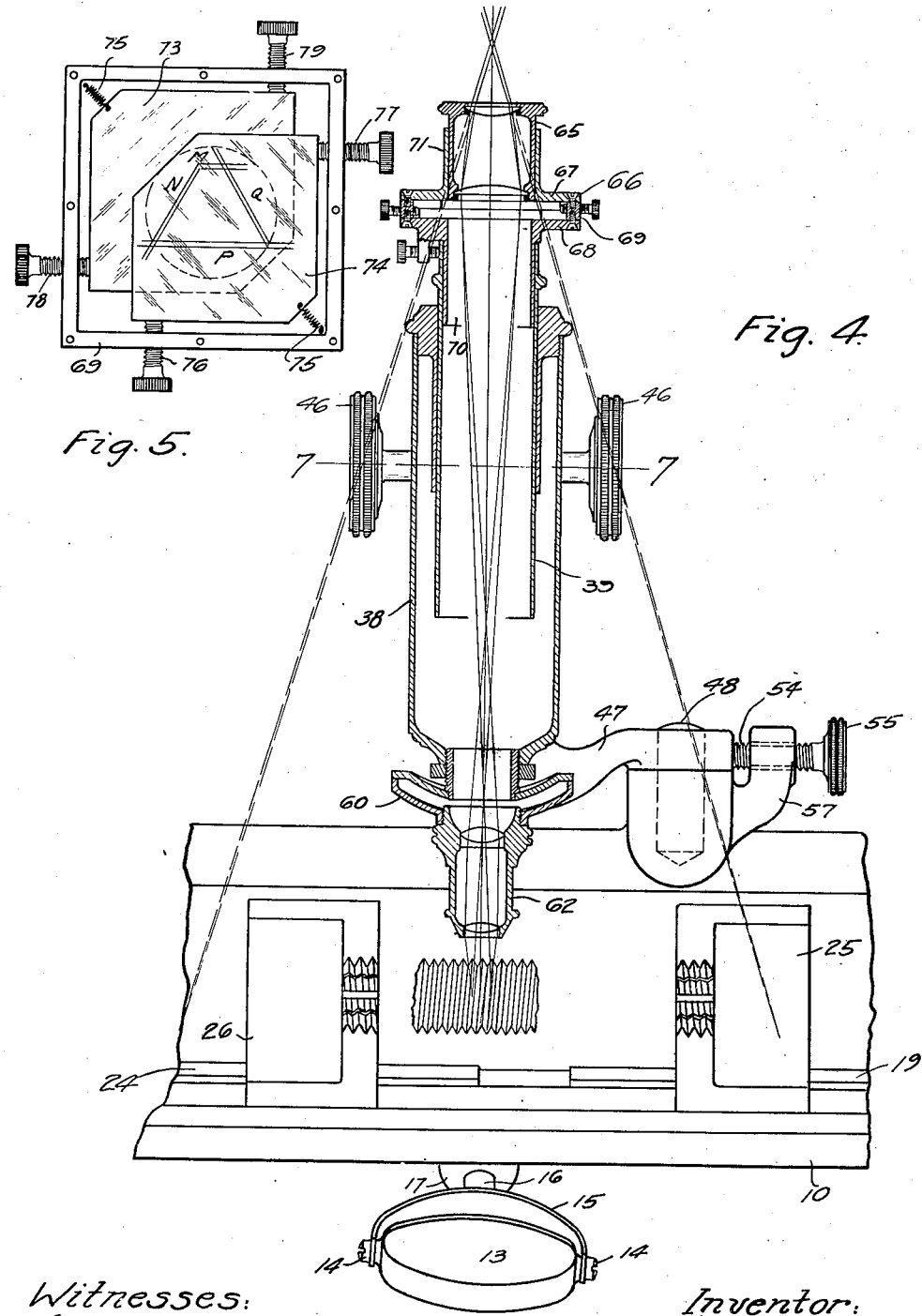

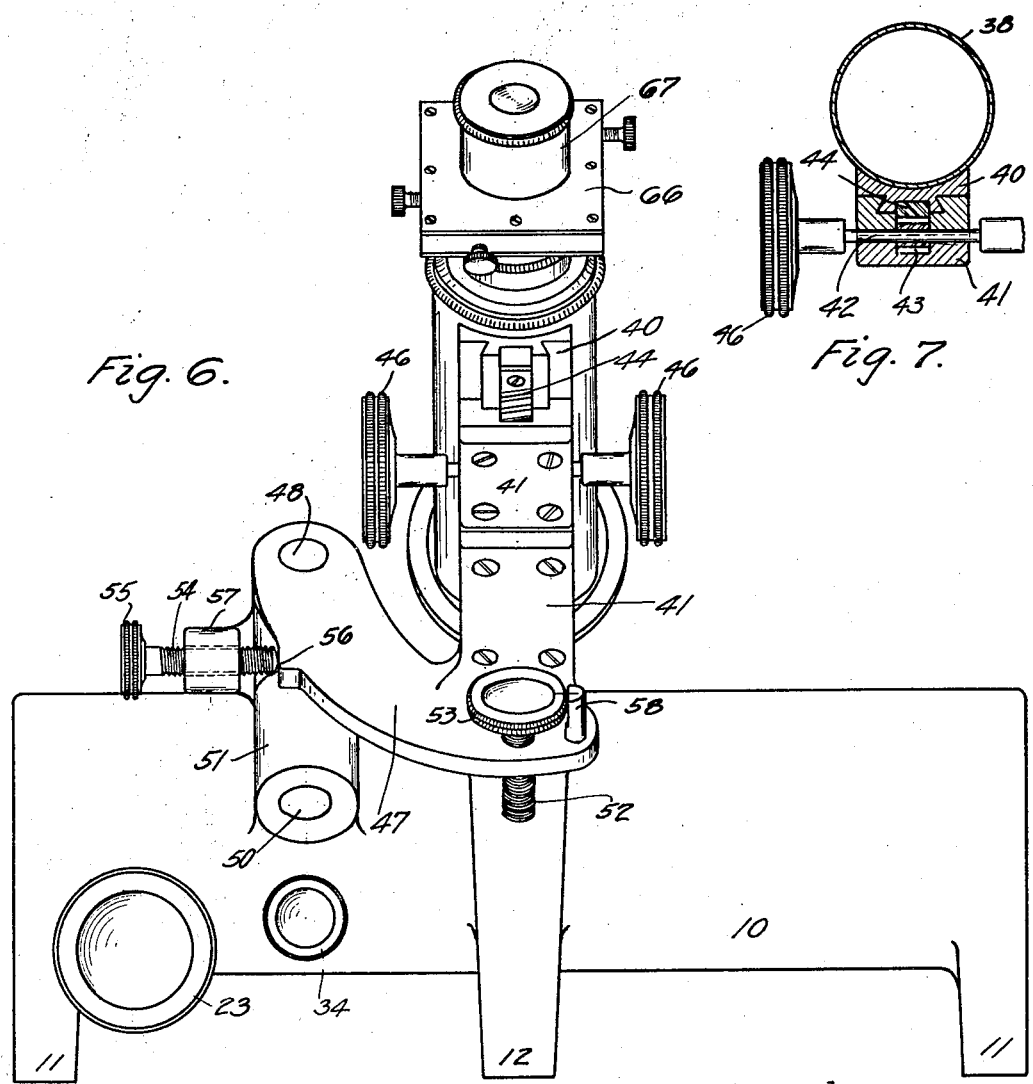

UNITED STATES PATENT OFFICE.

JAMES HARTNESS, OF SPRINGFIELD, VERMONT.

MECHANISM FOR GAGING SCREW-THREADS.

1,377,069.  Specification of Letters Patent.  Patented May 3, 1921.

Application filed September 16, 1919. Serial No. 324,108.

*To all whom it may concern:*

Be it known that I, JAMES HARTNESS, a citizen of the United States, residing at Springfield, in the county of Windsor and State of Vermont, have invented new and useful Improvements in Mechanism for Gaging Screw-Threads, of which the following is a specification.

This invention has for its object to gage and measure the deviations or variations of screw threads,—in form or profile, diameter, lead, roundness, compactness or smoothness of surface, etc. For this purpose, I employ a microscope having a novel stage on which the screw may be supported in proper relation to the objective. The microscope is provided with a chart located in operative relation to the ocular or eyepiece, and having indicated thereon a standard thread with which the screw to be gaged may be compared. For supporting the screw on the stage, I make use of cradles, of which one is fixed (though preferably adjustable) on which one end portion of the screw may be fixedly supported and accurately located, and the other is movable to adapt itself in position to receive the other end portion of the screw. Preferably these cradles are movable endwise of the screw so that the threads may be brought successively into registration with the objective, for comparison with the chart. I employ what may be termed an adjustable or universal micrometer chart which may be employed for gaging screws of all sizes. Since screws are cut by a tool having an included angle of 60°, it is apparent that the sides of the threads should thus be at the same angle irrespective of the diameter and lead of the screw. Furthermore, the crests and roots of the threads are in parallelism—being in width about one-eighth of the travel of the cutting tool per revolution. The micrometer chart therefore preferably consists of two slides, superposed one above the other, one slide having wires, webs or lines indicating one side and the crest of the thread, and the other having wires, webs or lines indicating the other side and the root of the thread. By adjusting the slides, the wires or lines may be located to indicate the size and contour or profile of the thread of any 60° screw. Since it is impractical commercially to produce screws of perfect uniformity, it is customary to allow a certain range of variation or tolerance, and hence the lines which form the reticle on the slides of the chart are doubled or spaced apart to indicate the boundaries of permissible tolerance. As a practical matter, the slides are preferably made of glass and the angular lines which form the reticle are etched or otherwise marked thereon, the etched faces being confronting to bring the lines as nearly as may be in the same plane.

On the accompanying drawing,—

Fig. 4 represents a longitudinal section on the plane of the axis of the tube.

Fig. 5 illustrates the micrometer box and the slides.

Fig. 6 represents a rear elevation of the microscope.

Fig. 7 represents a section on the line 7—7 of Fig. 4.

Figure 1:
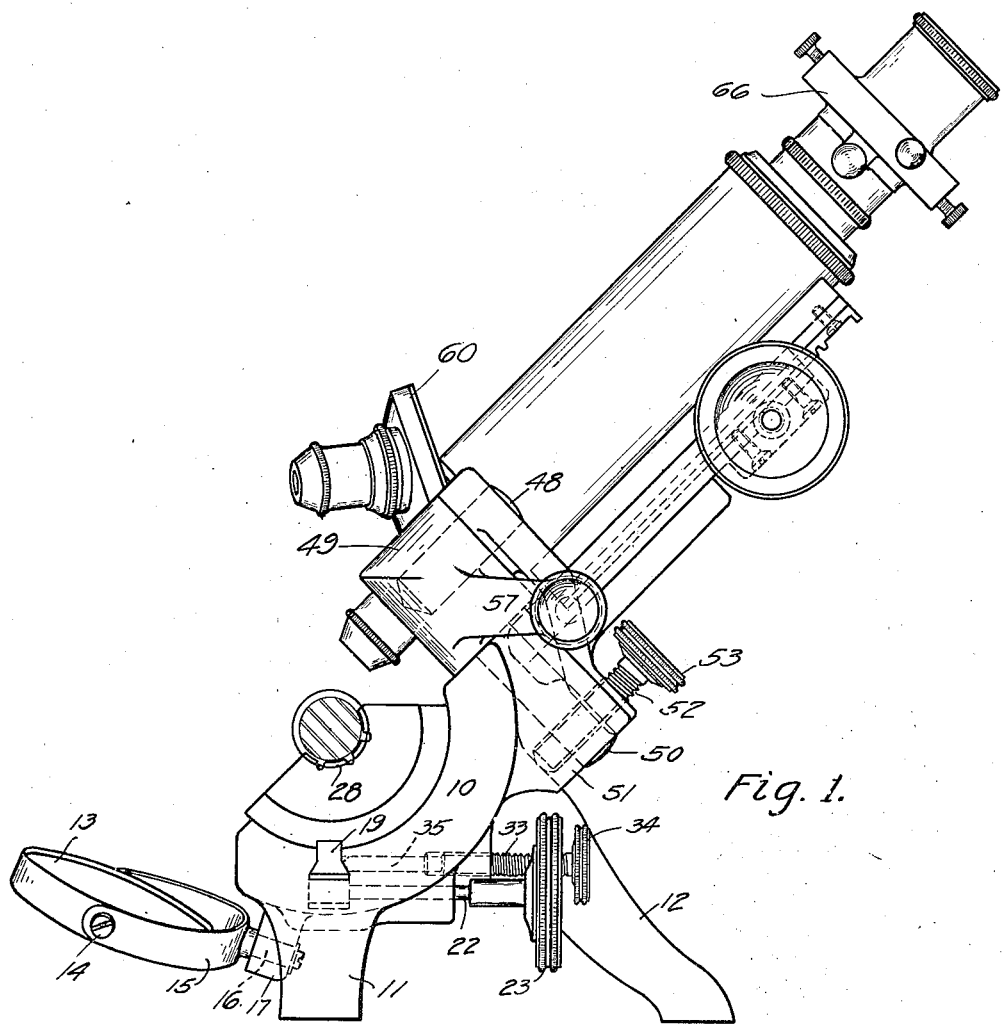
Figure 1 represents in side elevation a microscope embodying the invention.
Figure 2:
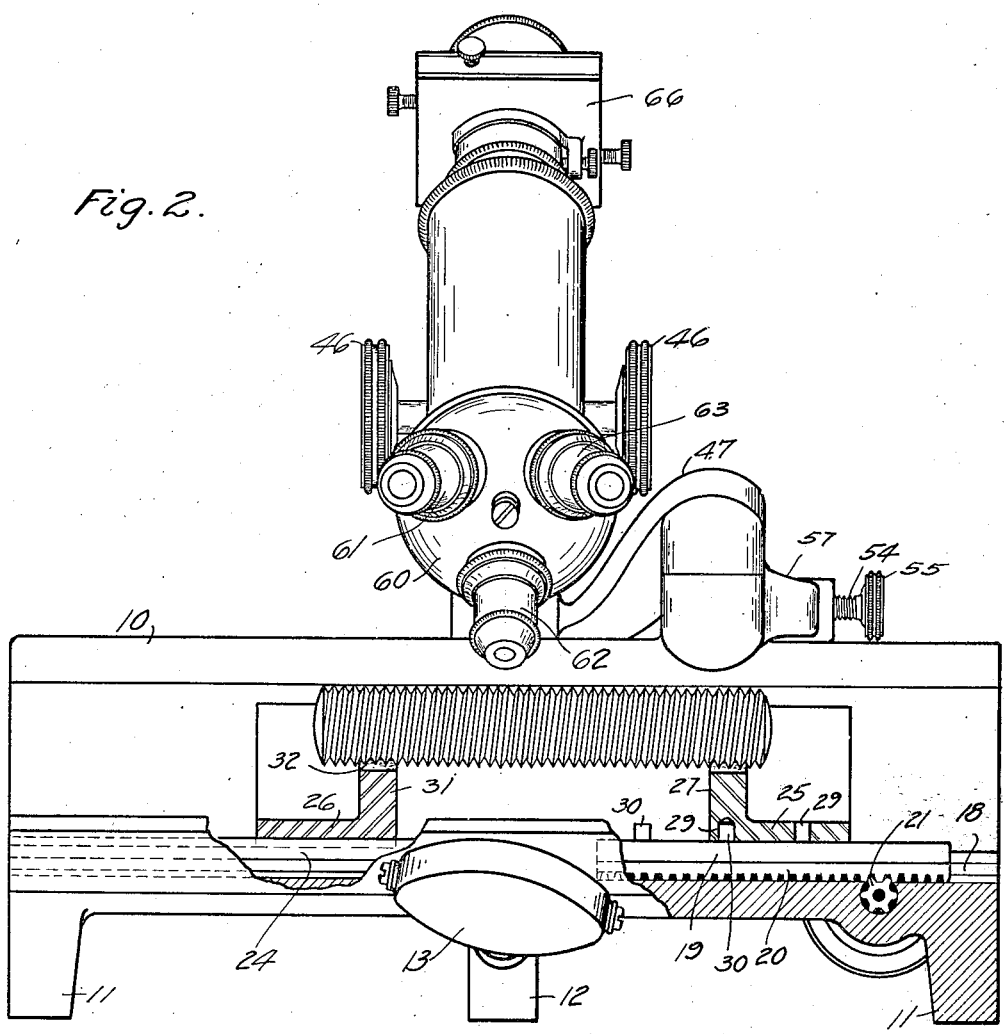
Fig. 2 represents a front elevation of the same partially in section.
Figure 3:
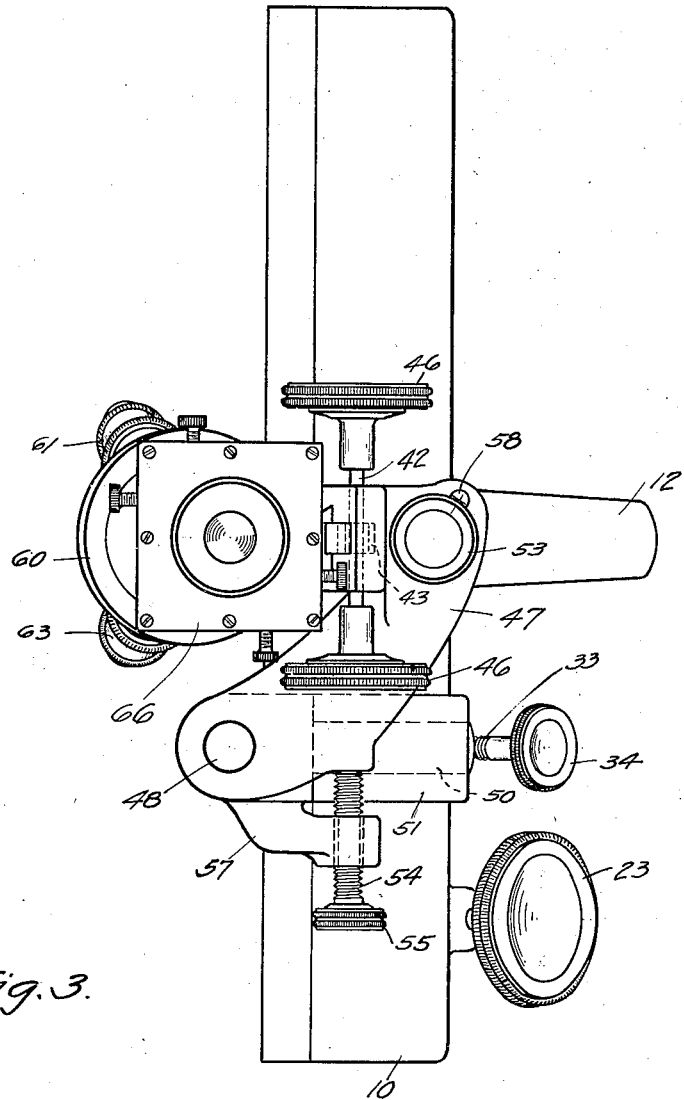
Fig. 3 represents a plan view in plane perpendicular to the axis of the tube.

The instrument, which I have selected as illustrating an embodiment of the invention, comprises a semi-cylindrical base 10 provided with suitable supporting legs 11 and 12, the legs 11 being at the ends of the base which is laterally elongated, and the leg 12 being in the rear and located intermediate of the ends. The mirror or reflector 13 is ordinarily supported by a gimbal joint comprising the pivots 14, the yoke 15 and the stem 16, the latter being swiveled in a lug 17 depending from the base. The concavo-convex base 10 constitutes a stage upon which the cradles for the screw are mounted. At the lowest point in the concavity of the base, there is a dove-tail groove or guideway 18 in which is located the complemental undercut slide 19 equipped with a rack 20. This slide may be adjusted longitudinally of the base by a pinion 21 mounted upon a shaft 22 journaled in a bearing formed in the base, and having upon its rear end a milled disk or handle 23 by which it may be rotated. Arranged in the same guideway 18, there is another slide 24, which, if desired, may likewise be adjusted by means such as described in connection with the slide 19 but which as shown is movable freely in the guideway longitudinally thereof. Supported in the concavity of the stage there are two devices indicated at 25, 26, respectively, which may be termed cradles.

Each has a segmental web or flange upon which the screw to be gaged may be supported. The flange of the cradle 25 is indicated at 27, and it has the semi-cylindrical threaded socket 28 to receive one end or portion of the screw to be measured or gaged. This cradle 25 has in its base a plurality of holes 29 to receive the pins 30 projecting upwardly from the slide 19. The cradle may thus be located in any desired position in respect to the slide and detachably fixed thereto so as to afford a fixed but adjustable support for one end of the screw, so as accurately to locate the screw longitudinally and transversely and to bring any predetermined part of the helix in the optical axis of the microscope. The cradle 26 has a flange 31 similar to that at 27, and having the semi-cylindrical threaded socket 32 for the other end of the screw. This cradle 26 I refer to as the movable cradle as it may be freely moved back and forth to receive what may be called the free end of the screw, so that it may be adjusted to receive the screw notwithstanding errors of lead therein. The cradles and sockets therein are so formed and arranged that the screw may be easily introduced from the front of the instrument in a direction laterally of the axis of the screw. After the slide 19 has been adjusted, it may be secured against further movement by an abutment screw 33 passed into a threaded aperture in the base and having a milled head 34 by which it may be rotated. The end of the screw abuts against a pin 35, the inner end of which is beveled to engage the beveled side of the slide 19.

The microscope which is used may be of any suitable construction, but, if desired, it may be mounted to permit various adjustments as will be subsequently explained. The precise construction of the microscope itself need not be described in detail more than to state that it is formed with the usual outer tube 38 and the draw tube 39. The outer tube 38 is provided with a dovetail guide 40 movable in a complemental guideway or block 41. Through the block there is passed a spindle 42 having a pinion 43 thereon intermeshing with a rack 44 secured to the guide 40. The ends of the spindle are provided with milled heads 46 by which it may be rotated. The block or guide 41 constitutes a standard for supporting the tube and the parts connected therewith. In accordance with my invention, the guide 41 may be formed with an arcuate arm 47, which at its free end is journaled upon a stud or pintle 48, the axis of which is parallel with the axis of the tube. This stud is supported by a member comprising a head 49 and a pintle or pin 50 formed on or secured thereto, the axis of which intersects the axis of the stud 48. The pin or pintle 50 is located in a bearing 51 formed on the rear side of the base, as best shown in Fig. 1. Through the arm 47 there is passed an abutment screw 52 having a head 53 on its upper or outer end. The lower end of the screw rests against the leg 12, so that, by turning the abutment screw, the arm 47 and the head 49 may be adjusted about the axis of the pivot pin 50, and thus the microscope may be adjusted angularly into alinement with the helix angle of the thread. The arm 47 may be adjusted about the axis of the pintle or pin 48 by an abutment screw 54 having a milled head 55 on one end and having its other end engaging a shoulder 56 formed on the side of the arm 47. The screw 54 is passed through an arm 57 formed on the head 49, as shown in Figs. 1 and 6. Placed in close proximity to the head of the screw 53, there is an index pin 58, and the head of the screw 53 is preferably formed with a scale so that it may be adjusted to and from any predetermined position in reference to its zero position in which the axis of the tube is perpendicular to a plane passing through the axis of the screw to be gaged.

Preferably the microscope is provided with a turret or nose 60 having a plurality of objectives of different focal lengths. As indicated the nosepiece may be provided with three objectives, 61, 62, 63. One objective may be thirty-two millimeters focal length with an initial magnification of four times to be used with threads from six to fourteen per inch; another objective may be of a focal length of sixteen millimeters with an initial magnification of ten times to be used with threads from fifteen to thirty per inch; while the third objective may have a focal length of eight millimeters with an initial magnification of twenty times to be used with all threads finer than thirty to the inch. By the use of one of these three objectives, the image of any thread to be gaged may roughly correspond in size to a thread which may be indicated in the micrometer box, so that the lines or webs of the latter will coincide with the image produced.

Between the inner tube 39 and the ocular 65 which is supported thereby, I locate a device indicated as a whole at 66, for carrying the reticle, and which may take the form of a box. The upper and lower walls of the box are formed by flanges 67, 68, between which is located the square frame 69 which forms the side walls of the box. The flanges 67 and 68 are formed respectively on the lower and upper ends of the sleeves 71, 70, the sleeve 70 extending down into the tube 39 and the sleeve 71 receiving the ocular with its lenses. Located within the box is a tolerance chart. If desired, though not necessarily, this chart may consist of two slides 73, 74, which are arranged to overlap, and which fit snugly between the top and bottom walls 67, 68 of the box. These slides are much smaller in dimensions than the box itself so that they are capable of adjustment therein. Each slide is made of glass and is connected to a spring 75 which is attached at one end to a corner of the box and at its other end to a corner of the slide. For the slide 74 there are two adjusting screws 76, 77, arranged at right angles to each other, and passed through the side walls of the frame so as to bear against the edges of the slides. These screws are provided with milled heads so that they may be easily turned, and by them the slide 74 may be adjusted in any direction in its plane. The slide 73 is likewise adjusted by two abutment screws 78, 79, passed through the side walls of the frame and engaging the side edges of the slide. The contacting faces of the slides are provided with lines to form a reticle, the slide 74 having the angular lines P Q and the slide 73 having the angular lines M N. The lines N Q indicate the side walls or flanks of a screw thread, and the lines M P indicate the crest and root of the thread. The lines may be single, if desired, but preferably those for the sides, crest and root of the thread are parallel or spaced apart a width corresponding to the maximum tolerance or variation which is permissible in screws which are interchangeable. Of course a single slide, having the described reticle indicating the boundaries of tolerance may be used instead of that described.

The apparatus may be used as follows. For gaging a plurality of screws of any given size and dimensions, a standard screw is first located in the cradles with the fixed cradle preferably at some distance laterally from the axis of the objective or optical axis, and the microscope is adjusted until the contour of the image of a single thread is sharp. Then the slides are adjusted until the thread lies accurately within the boundaries formed by lines N Q, M P. The objective, which is selected for use, is determined by the size of the screw and the number of threads per inch. The standard screw is then removed and a screw to be gaged is substituted therefor, the fixed cradle having been secured in position. The thread or portion of the helix selected for examination is located preferably a certain distance longitudinally from the fixed cradle, and consequently, when it is compared with the tolerance chart, it is apparent that the inspector will be able to detect and measure not only errors in the surface, diameter and form or profile of the thread, but also in the lead of the screw. If the image of the thread falls within the boundaries of tolerance indicated on the chart, the lead of the screw and the diameter thereof and the contour of the thread are all correct and the screw is acceptable. It is apparent, however, that the screw may be rotated so that the observer may inspect a complete convolution or helix of the thread. If desired, the cradles may be adjusted so as to bring successive threads, or threads located at different portions of the screw, into position for observation and comparison with the tolerance chart.

Having thus explained the nature of my said invention and described a way of making and using the same, although without attempting to set forth all of the forms in which it may be made or all of the modes of its use, what I claim is:

1. An apparatus for gaging screw threads comprising a microscope, a fixed device for accurately locating the helix of a screw longitudinally and transversely to bring into the optical axis a part of the same helix spaced from said fixed device, and a tolerance chart having indicated thereon the boundaries of permissive deviation from a standard thread, within which boundaries the image of such spaced part of said helix should lie.

2. Apparatus for gaging screw threads, comprising a microscope having a stage provided with spaced cradles for the screw to be gaged, one of such cradles being arranged to locate the helix of a screw longitudinally and transversely to bring into the optical axis a part of the same helix longitudinally spaced from said cradle, and a tolerance chart having indicated thereon the boundaries of permissive deviation from a standard thread, within which boundaries the image of such spaced part of the helix should lie.

3. Apparatus for gaging screw threads comprising a microscope, a tolerance chart having a reticle indicating in profile permissive boundaries of tolerance, a stage, and means on said stage for locating said helix so as to bring a part of said helix, which is longitudinally spaced from such means, into the optical axis for comparison of its image with the tolerance chart.

In testimony whereof I have affixed my signature.

JAMES HARTNESS.